Dec. 16, 1969  W. NICHOLLS  3,484,538
ELECTRICAL BUS BAR SYSTEM
Filed March 22, 1967
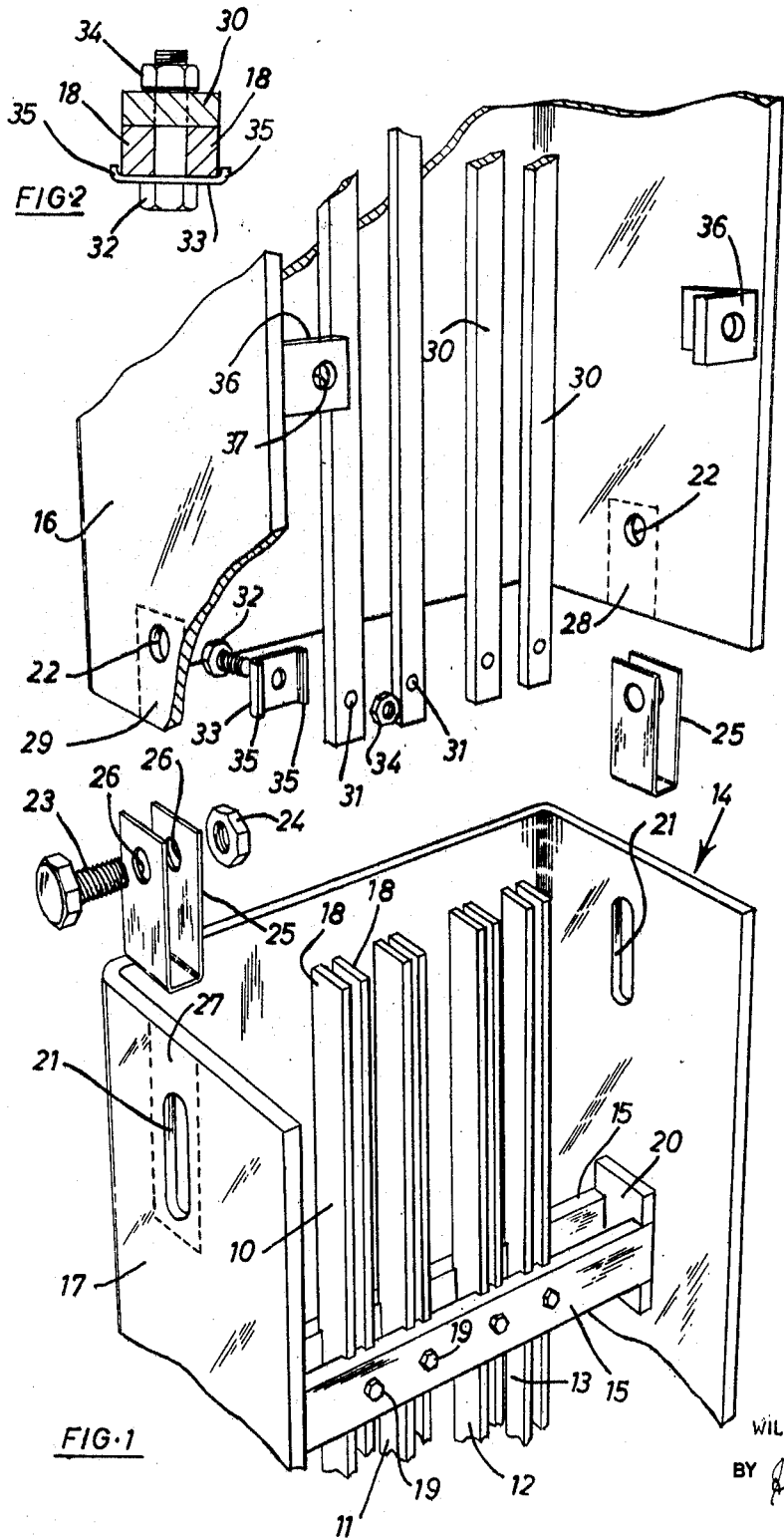
INVENTOR:
WILFRID NICHOLLS

United States Patent Office 3,484,538
Patented Dec. 16, 1969

3,484,538
ELECTRICAL BUS BAR SYSTEM
Wilfrid Nicholls, Childwall, Liverpool, England, assignor to Maxam Switchgear Limited, Liverpool, England
Filed Mar. 22, 1967, Ser. No. 625,264
Int. Cl. H02g 15/08
U.S. Cl. 174—88                                    4 Claims

ABSTRACT OF THE DISCLOSURE

A telescopic joint between overlapping ends of channel-like duct members of bus bar ducting is formed by bolts passing through an oblong hole in one duct member and a hole in the other duct member. A copper shim is interposed between the overlapping surfaces which are free of paint or enamel so as to provide a good earthing connection between the duct members. Each bus comprises a pair of spaced parallel bars. The joint between adjoining bus sections comprises a fish plate clamped against the longitudinal edges of the bars by bolts which pass through the gap between the bars.

---

The present invention relates to an electrical bus bar system and more particularly to a telescopic joint in electrically conductive ducting containing electrical bus bars.

In electrical bus bar systems it is often impossible to plan in advance the exact length of the bus bars and their ducting and the bus bars and ducting have to be finally fitted on installation. It is an object of the present invention to provide a telescopic joint for the ducting which enables the length of the ducting to be adjusted on the site and which at the same time provides a satisfactory electrical continuity in the ducting itself. Such continuity is required to enable the ducting to be satisfactorily earthed.

Accordingly the present invention provides that the ends of two electrically conductive duct members of bus bar ducting are adapted to be joined together in an adjustable manner by the provision of bolts, screws or the like, each of which passes through a longitudinal oblong hole in one end of one of the duct members and through a hole in the other end of one of the duct members, said ends of the duct members being adjustably telescoped one within the other, there being provided a shim of copper or like electrically conducting material between the overlapping surfaces of the duct members in the region of at least one of the bolts or the like, such overlapping surfaces in this region being free from paint or enamel or any other poorly electrically conductive covering.

Conveniently the surfaces of the duct members which are to be free from a poorly conductive covering are masked by means of a suitable adhesive tape whilst the duct members are painted or enameled. Such tape is removed after the enameling or painting operation has been completed.

The copper or like metal ensures that an adequate electrical connection is maintained between the two duct members even during any movement of one member relative to the other which may occur due to temperature changes.

According to another aspect of the present invention, a connection between two bus sections each comprising a pair of parallel electrically conductive strip-like bars comprises a fishplate overlapping the adjacent ends of the bus sections to be joined and lying with its flat side against the longitudinal edges of the conductive strip-like bars, a washer-like member or another fishplate resting against the opposite longitudinal edges of each pair of strip-like bars and a bolt or screw passing through each washer-like member or said other fishplate, through the gap between the respective pair of conducting strip-like bars and through the first-mentioned fishplate to maintain the fishplate or fishplates in good electrical contact with the bus sections whilst permitting relative longitudinal movement therebetween.

Preferably the washer-like member is a plate with its opposite edges flanged over to overlie the outside edges of the electrically conductive strip-like bars to prevent these bars being spread apart.

The invention is further described, by way of example, with reference to the accompanying drawings, in which:—

FIG. 1 is an exploded perspective view of part of a telescopic joint in an electrical bus bar installation constructed in accordance with the invention; and FIG. 2 is a transverse cross-section through part of the joint in one of the bus bars.

Referring to FIG. 1, a bus bar system includes four bus sections 10, 11, 12 and 13, supported in ducting 14 by insulating strips 15. The joint in the ducting comprises a joint member 16, the ends of which may be telescoped over the adjacent ends of respective main duct members 17 (only one of which is shown). The insulating strips 15 are provided in pairs, of which only one pair is seen in the drawings. Each bus section 10, 11, 12 and 13 comprises a pair of copper strips 18 and the copper strips are clamped between each pair of insulating strips 15 by bolts 19 which pass through the spaces between the pairs of strips 18. The insulating strips 15 are grooved to locate the copper strips 18. The ends of the insulating strips 15 are supported in H-shaped brackets 20 spot-welded to the sides of the duct member 17.

An oblong hole 21 is provided in each side of the duct member 17 adjacent its end and round holes 22 are provided in the adjoining end of the joint member 16. The joint member 16 is of slightly larger breadth than the trunk member 17 and thus its sides lie outside the sides of the trunk member 17. Bolts 23 (only one of which is shown) pass through the holes 21 and 22 and nuts 24 are screwed onto the bolts 23 to secure the member 16 to the member 17 but the oblong holes 21 permit relative sliding movement and adjustment therebetween.

In practice it is virtually essential that a satisfactory electrical bond be always achieved and maintained between the members 16 and 17. To maintain this bond, copper strips 25 are placed between the adjoining surfaces of the members 16 and 17 and are provided with holes 26 through which the bolts 23 pass. The copper strips 25 are in fact for convenience bent to a U-shape as illustrated, and each shank has a hole 26. One shank lies between the members 16 and 17 whilst the other shank lies outside the joint member 16 and is thus exposed to view. It can thereby be readily ascertained whether the conductive strips 25 have been correctly placed in position. The regions 27 on the outside of the duct member 17 around the oblong holes 21 and the regions 28 and 29 on the inside and outside of the joint member 16 around the holes 22 are kept free from any enamel, paint or other coating material which is of poor electrical conductivity so that the copper strip 25 is maintained in good electrical contact both with the duct member 17 and with the joint member 16. The copper strip 25 can be quite thin, yet it will maintain a satisfactory electrical connection between the members 16 and 17.

The members 16 and 17 are usually of stove-enamelled, galvanized sheet steel. To avoid having to scrape off the enamel in the regions 27, 28 and 29 to expose the metal, these regions are masked by adhesive tape during the enamelling process and this tape is removed subsequently.

A sliding joint is also required between each pair of adjoining bus sections themselves and four fishplates 30, one for each bus, are provided for this purpose. At each end each fishplate has a hole 31 and a bolt 32 passes through a washer-like member 33, through the space between a pair of copper strips 18 forming a bus section and through the hole 31 at the respective end of the fishplate 30. A nut 34 is tightened on the bolt 32 to firmly clamp the fishplate 30 against the longitudinal edges of the copper strips 18. Opposite edges of the washer-like member 33 are flanged over at 35 so as to overlie the outside faces of the copper strips 18 and prevent the ends of these strips spreading apart when the nuts 34 are tightened.

In practice it is convenient to provide a short joint member 16 and short fishplates 30 for joining together two comparatively long duct members 17 containing buses 10, 11, 12, 13. Only one end of the joint member 16 and one end of each of the fishplates 30 is illustrated but both ends in practice are constructed identically so that the not illustrated end can be joined to another duct member 17 similar to that illustrated. In the use of the invention in vertical trunking, it is convenient for the duct member 17 containing the bus sections 10, 11, 12, 13, to be manufactured from floor to ceiling height and for the joint members 16 and the fishplate 30 to be manufactured of a length just slightly over the depth from one ceiling to the floor above.

Conventional covers (not illustrated) are provided for the duct members 17. A cover (also not illustrated) for the joint member 16 may be secured to brackets 36 on the members 16 by screws into tapped holes 37 in these brackets.

Although the drawings only show one slot 21 and one hole 22 at each side of the duct members, two or more such slots and holes may be provided at each side if desired. However, there need only be one copper strip 25 associated with one of the slots 21 and holes 22 to provide the necessary electrical continuity.

Furthermore, although the drawings only show one bolt 32 at one end of a fishplate 30, two such bolts are preferably provided at each end together with washer-like members 33.

I claim:

1. A combination ducting and bus bar system in said ducting comprising
    ducting including three electrically conductive duct members,
    means joining said duct members in end to end relationship in an adjustable manner,
    the middle of said three duct members being comparatively short and constituting a joint member,
    said joining means comprising at least one longitudinal oblong first hole means at one end of one of said duct members,
    at least one second hole means at one end of another of said duct members to be joined thereto and such that said ends can be overlapped in telescopic relationship, thereto and such that said ends can be overlapped in telescopic relationship,
    first bolt means passing through said holes for joining said duct members together in an adjustable manner,
    a shim of electrically conductive material between the overlapping surfaces of said duct members in the region of at least said first bolt means, said overlapping surfaces in this region being free from poorly electrically conductive covering,
    said bus bar system including,
    two bus sections, one in each of the two outer ones of said three duct members and each comprising a pair of parallel electrically conductive strip-like bars,
    a fishplate accommodated in said joint member, said fishplate overlapping the adjacent ends of said bus sections and lying with its flat side against the longitudinal edges of said conductive strip-like bars,
    plate means resting against the opposite longitudinal edges of each pair of strip-like bars, and
    second bolt means passing through said plate means, through the gap between the respective pair of conductive strip-like bars and through said fishplate to maintain the fishplate in good electrical contact with the bus sections to electrically connect said bus sections together while permitting relative longitudinal movement therebetween.

2. A bus bar system according to claim 1 further comprising member pairs of insulating strips, means clamping said insulating strips against opposite longitudinal edges of said strip-like bars, said insulating strips having grooves in which said longitudinal edges of said conductive strip-like bars are located, and means supporting said insulating strips in said duct members.

3. A bus bar system according to claim 2 in which said clamping means comprises bolts which pass through the insulating strips and between the pairs of conductive strip-like bars.

4. The combination of ducting and a bus bar system in said ducting, said ducting including two electrically conductive duct members, one having at least one longitudinal oblong hole at one end thereof and the other having at least one hole at one end thereof and such that said ends can be overlapped in telescopic relationship, bolt members passing through said holes to join said duct members together in an adjustable manner, and a shim of electrically conductive material between the overlapping surfaces of said duct members in the region of at least said bolt means, such overlapping surfaces in this region comprising a pair of parallel electrically conductive strip-region being free from poorly electrically conductive covering, and said bus bar system including a bus section like bars, means insulatedly supporting said bus section in a first of said duct members, a fishplate accommodated in a second of said duct members, said fishplate overlapping the adjacent end of said bus section and lying with its flat side against the longitudinal edges of said conductive strip-like bars, plate means resting against the opposite longitudinal edges of said strip-like bars and bolt means passing through said plate means, through the gap between the pair of conductive strip-like bars and through sad fishplate to maintain the fishplate in good electrical contact with the bus section to electrically connect said bus section to said fishplate while permitting relative longitudinal movement therebetween.

References Cited

UNITED STATES PATENTS 2,261,857  11/1941  Novak et al.
2,992,291  7/1961  Kussy.

DARRELL L. CLAY, Primary Examiner

U.S. Cl. X.R.

174—78, 86; 339—246